Sept. 26, 1950 H. O. M. JAMPOLER ET AL NOW BY CHANGE OF NAME H. O. JASON 2,523,303

DEVICE FOR TRANSMITTING CODED ELECTRICAL IMPULSES

Filed Jan. 31, 1946 3 Sheets-Sheet 1

INVENTORS
HERBERT O. JASON
HERSHEY LERNER
BY Byerly, Watson & Simonds
ATTORNEYS

DEVICE FOR TRANSMITTING CODED ELECTRICAL IMPULSES
Filed Jan. 31, 1946 3 Sheets-Sheet 2

INVENTORS
HERBERT O. JASON
HERSHEY LERNER
BY Byerly, Watson & Simonds
ATTORNEYS

INVENTORS
HERBERT O. JASON
BY HERSHEY LERNER
Beyerly, Watson & Simonds
ATTORNEYS Patented Sept. 26, 1950

2,523,303

UNITED STATES PATENT OFFICE 2,523,303

DEVICE FOR TRANSMITTING CODED ELECTRICAL IMPULSES

Herbert O. M. Jampoler, New York, and Hershey Lerner, Jackson Heights, N. Y.; said Lerner assignor to said Jampoler; said Jampoler now by change of name Herbert O. Jason Application January 31, 1946, Serial No. 644,513

8 Claims. (Cl. 179—90.2)

This invention relates to a remote control system and aims to provide a simple and convenient system for producing and transmitting coded signals. A particular object of the invention is to provide an automatic means for operating a dial telephone to call predetermined numbers without rotating the dial.

The system includes an electric circuit having a plurality of groups of parallel branches, each of which contains two switches. One set of the switches is controlled by an impulse device which closes these switches in all the branches successively so as to send out a series of current impulses. The other switches of the branches are controlled by a coding device which provides a simple means for closing the switches in selected branches of each group. The combined result of the coding device and the impulse device is, therefore, to send out a series of groups of impulses in which the number of impulses in each group corresponds to a code.

The impulses produced in the circuit operate an electromagnetic device which effects connections between telephone stations by interrupting a telephone circuit in the manner in which the latter circuit would be interrupted by operating the usual dial.

An important feature of the invention consists in making the apparatus automatic in operation so that a single manual operation, such as pushing a button corresponding to a particular code card, results in calling the number to which the card corresponds. This is achieved by making the manual operation bring the code card into operative relationship with the circuit to close the gaps in selected branches and at the same time start a motor operating the impulse device, and in arranging the impulse device to stop the motor after it has closed and opened a gap in each branch of the circuit.

Another important feature of the invention consists in the use of a control card having a dielectric base with spaced strips of conductive material on its face. Each conductive strip has an end area and a set of indexed areas of equal size and the strips are arranged so that, to make the card close only the branches of the circuit which correspond to a desired number, it is necessary merely to insulate a predetermined number of indexed areas from the end areas.

In order that the invention may be clearly understood, we will describe in detail the specific embodiments of it which are shown in the accompanying drawings, in which.

Figure 1:
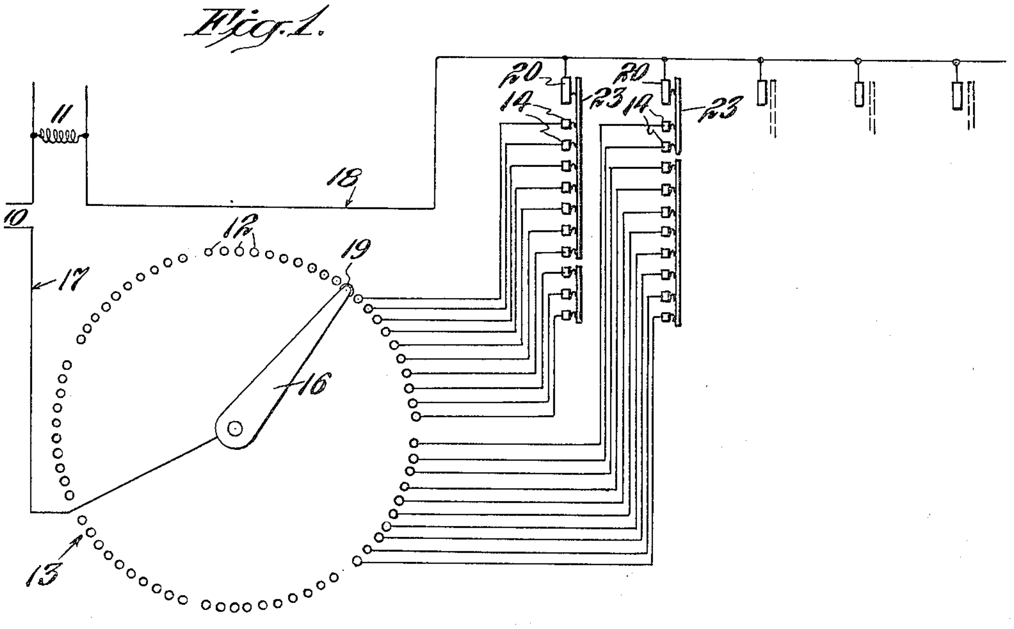
Fig. 1 is a diagram of the signal circuit showing the impulse device and a portion of one of the coding devices.

The signal circuit shown in Fig. 1 includes a source of voltage 10 and an electromagnet 11. The circuit has seventy parallel branches which are divided into seven groups of ten each. Each branch extends from one of the contacts 12 of a rotary switch 13 to one of the spring contacts 14 of a coding device 15. The wiper 16 of the rotary switch 13 is connected by a conductor 17 to the source of voltage 10, while the return wire 18 of the coding device is connected to the electromagnet 11.

The rotary switch 13 constitutes an impulse device. The wiper 16 is rotated to open and close all seventy branches successively on each revolution so as to send a current impulse through each branch in succession when the branches are closed at the coding device. The wiper is rotated at a uniform rate so that these impulses are separated by uniform time intervals, except that the spacing of the contacts 12 is such that slightly longer intervals are provided between the seven groups of branches. The impulse device most desirably has an additional contact 19 which may be used to stop the rotation of the wiper after one revolution, as hereinafter explained.

The coding device 15 is provided with seven rows of spring contacts. Each row of contacts includes the ten contacts 14 connected to one of the groups of branches of the circuit and an additional contact 20 connected to the return wire 18. The control card 21 used in the coding device consists of a base 22 of dielectric material, such as cardboard, having on its operative surface seven strips of conductive foil 23 which serve to connect the contacts 14 of each row with the contact 20 of that row. Any desired number of the ten contacts 14 of each row may be disconnected from the contact 20 of that row by merely breaking the strip of conducting foil at any desired point by drawing a pencil or stylus across it. The branches of the circuit connected to contacts below the break in the foil are interrupted so that, on rotation of the wiper of the impulse device, no current impulse is passed through these branches. The effect of a revolution of the wiper of the impulse device is, therefore, to send through the circuit and to the electromagnet 11 seven groups of impulses in which the number of impulses in each group depends upon the point at which the conducting foil on one column of the code card is broken. Such a series of impulses, when used to interrupt the circuit of a dial telephone, serves to call the number whose digits correspond to the number of impulses in each group. Arrangements of the signal circuit for automatically accomplishing this result are shown in Figs. 2 and 3.

Figure 2:
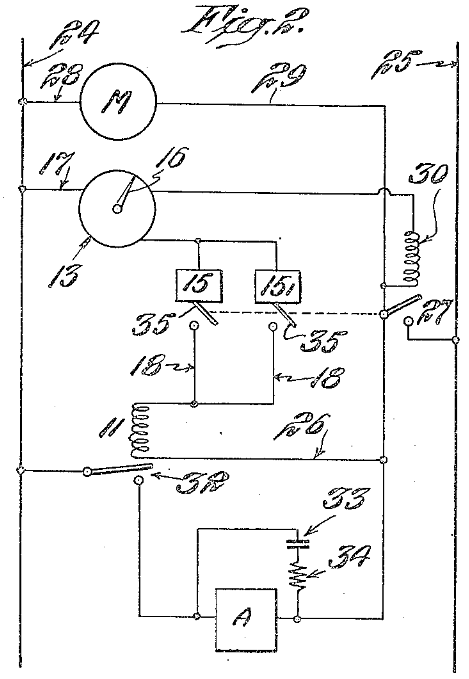
Fig. 2 is a circuit diagram of a complete system for automatically calling a number by depressing a telephone line-switching plunger.
Figure 3:
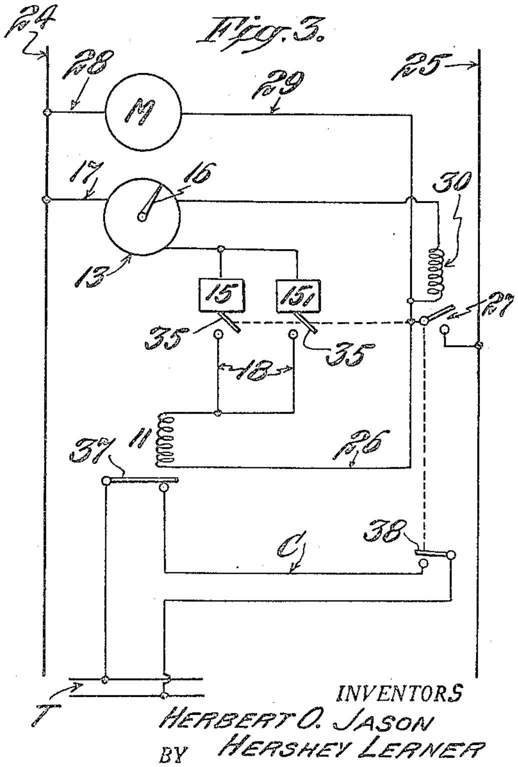
Fig. 3 is a circuit diagram of the system arranged for automatically calling a number by interrupting the telephone circuit.

In Fig. 2, 24 and 25 are line wires from which current is obtained. The signal circuit which has been described includes the conductor 17 connected to the lead 24, the impulse device 13, a plurality of coding devices 15, 15′, the electromagnet 11 and a conductor 26 connected to the lead 25 through a switch 27. The wiper of the impulse device is driven by a motor M connected between the lead 24 and the switch 27 by conductors 28 and 29. The contact 19 of the impulse device 13 is connected to an electromagnet 30 which serves to open the switch 27 after the wiper has made one complete revolution.

An electromagnetic actuator A for drawing down the line-switching plunger 31 of the telephone is connected between the lead 24 and the switch 27 through a relay switch 32 which is closed by the electromagnet 11 in the signal circuit whenever a current impulse passes through that circuit. Preferably, a condenser 33 and inductance 34 are connected across actuator A to prevent sparking or arcing in the circuit.

The coding devices 15, 15′ are connected in parallel in all the branches of the signal circuit, and each provides a manually operable switch 35. The switches 35 are mechanically connected to the switch 27 in such manner that manual closing of any of the switches 35 closes the switch 27, while automatic opening of the switch 27 opens any one of the switches 35 which has been closed. The mechanical connection is described in connection with Figs. 4 and 5.

The operation of the circuit shown in Fig. 2 is as follows: If the number corresponding to the code card in the coding device 15 is to be called, it is necessary merely to close the switch 35 which at the same time closes the switch 27. Current then flows through the motor rotating the wiper 16 of the impulse device 13 to send seven groups of impulses through the electromagnet 11. Corresponding impulses pass through the actuator circuit causing the actuator to depress the telephone line-switching plunger 31 so as to call the number designated. After the seven groups of impulses have been sent out, the wiper of the impulse device reaches the contact 19, sending a current impulse through the electromagnet 30 which opens the switch 27 as well as that one of the switches 35 which has been closed and stops the operation of the device. To permit the actuator A to operate the telephone switch, the telephone receiver must, of course, be lifted from the line-switching plunger 31 before the switch 35 is closed.

The circuit shown in Fig. 3 is similar to that shown in Fig. 2 except that it is arranged for interrupting the circuit of the telephone directly instead of through the telephone line-switching plunger. The circuit T of the telephone is connected into a circuit C containing a relay switch 37 and a time switch 38. The relay switch 37 is associated with the electromagnet of the signal circuit in such manner that each impulse in the signal circuit opens the switch 37 to interrupt the telephone circuit. With this arrangement, a telephone connection is effected by closing one of the switches 35 without removing the telephone receiver. In order to prevent the circuit T of the telephone from remaining closed in case the user forgets to raise the telephone after closing one of the switches 35, the time switch 38 is provided. The time switch is mechanically connected to the switch 27 so that it is closed when the switch 27 is closed. It remains closed for a period of time slightly greater than the time required for one revolution of the wiper of the impulse device and then automatically opens.

Figures 4, 5, 6:
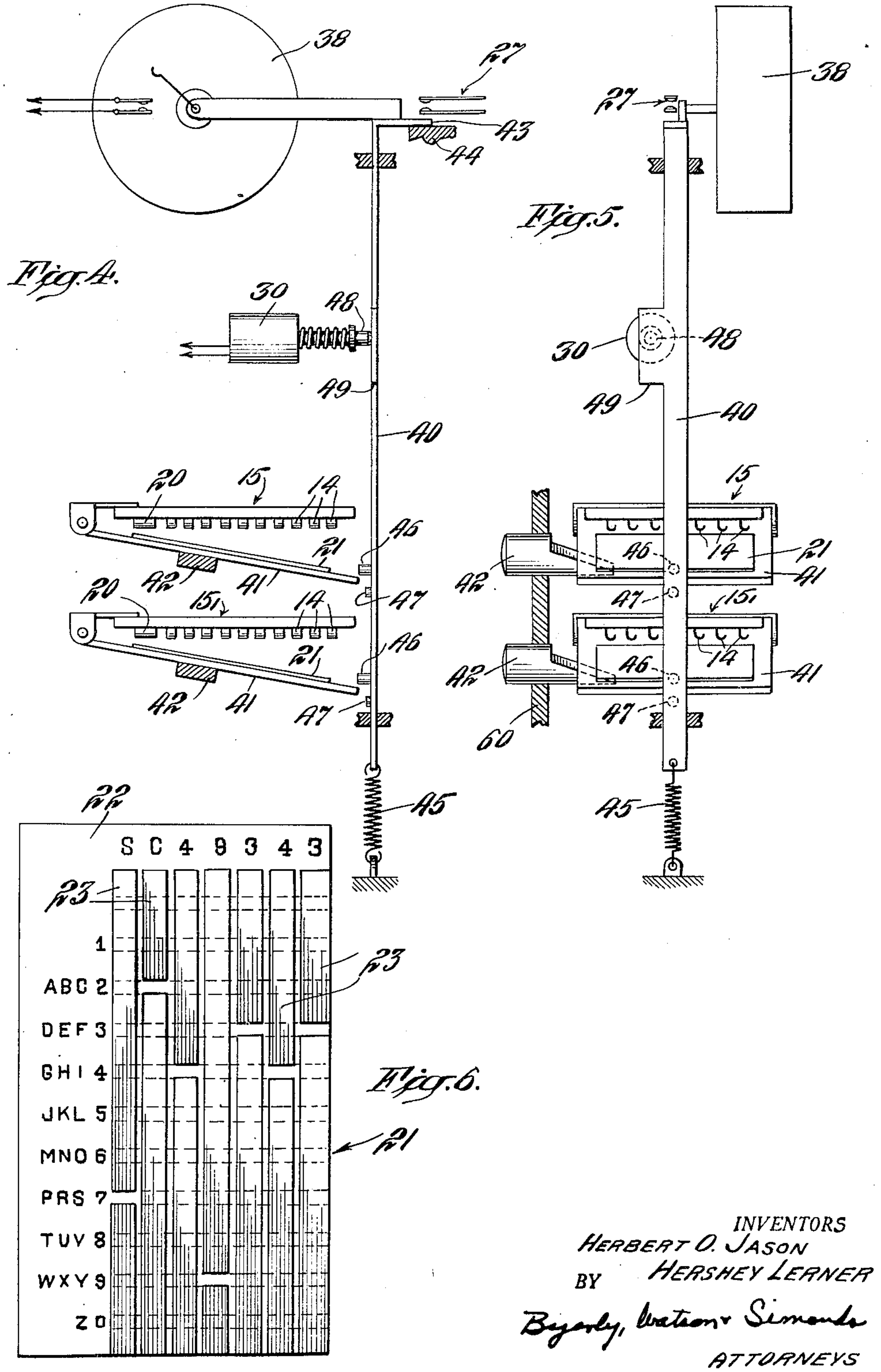
Fig. 4 is a top view, and Fig. 5 a side view of a set of coding devices and switch-operating means connected to them.
Fig. 6 is a face view of the control card illustrated in part in Fig. 1.

In the apparatus illustrated in Figs. 4 and 5, the switches 35 are formed by the coding devices 15, 15′. Each is mechanically connected independently of the others with the switch 27 and the time switch 38 by means of a slide bar 40. Each coding device 15, 15′ has a hinged tray 41 which supports a removable code card 21 and is provided with a push button 42. The slide bar 40 has a lip 43 which is urged against the stop 44 by spring 45 and is provided with a series of pairs of lugs 46, 47 which are adapted to abut the ends of trays 41. Depression of push button 42 swings the tray 41 around until the card 21 is held against the spring contacts 14, 20 and engagement of the edge of that tray with lug 46 pushes the slide bar 40 to a position where its lip 43 causes the contacts of the switch 27 and the time switch 38 to be closed. Slide bar 40 is held in this closed position by engagement of the spring-pressed plunger 48 of electromagnet 30 with the lower edge of the abutment 49.

The dimensions of the tray 41 and the lug 47 are such that lug 47 may move past the end of the tray without touching it when the tray is in the open position illustrated in Fig. 4. However, when the tray is in closed position, the lug 47 engages its lower edge and holds it in closed position until slide bar 40 is released. This release is accomplished by actuation of electromagnet 30 to withdraw plunger 48 after the wiper 16 has made one complete revolution and reaches contact 19. The time switch 38 is of conventional construction and is so adjusted that it will remain closed for the interval necessary to permit removal of the telephone from its cradle after slide bar 40 has returned to open position.

Figures 7, 8, 9:
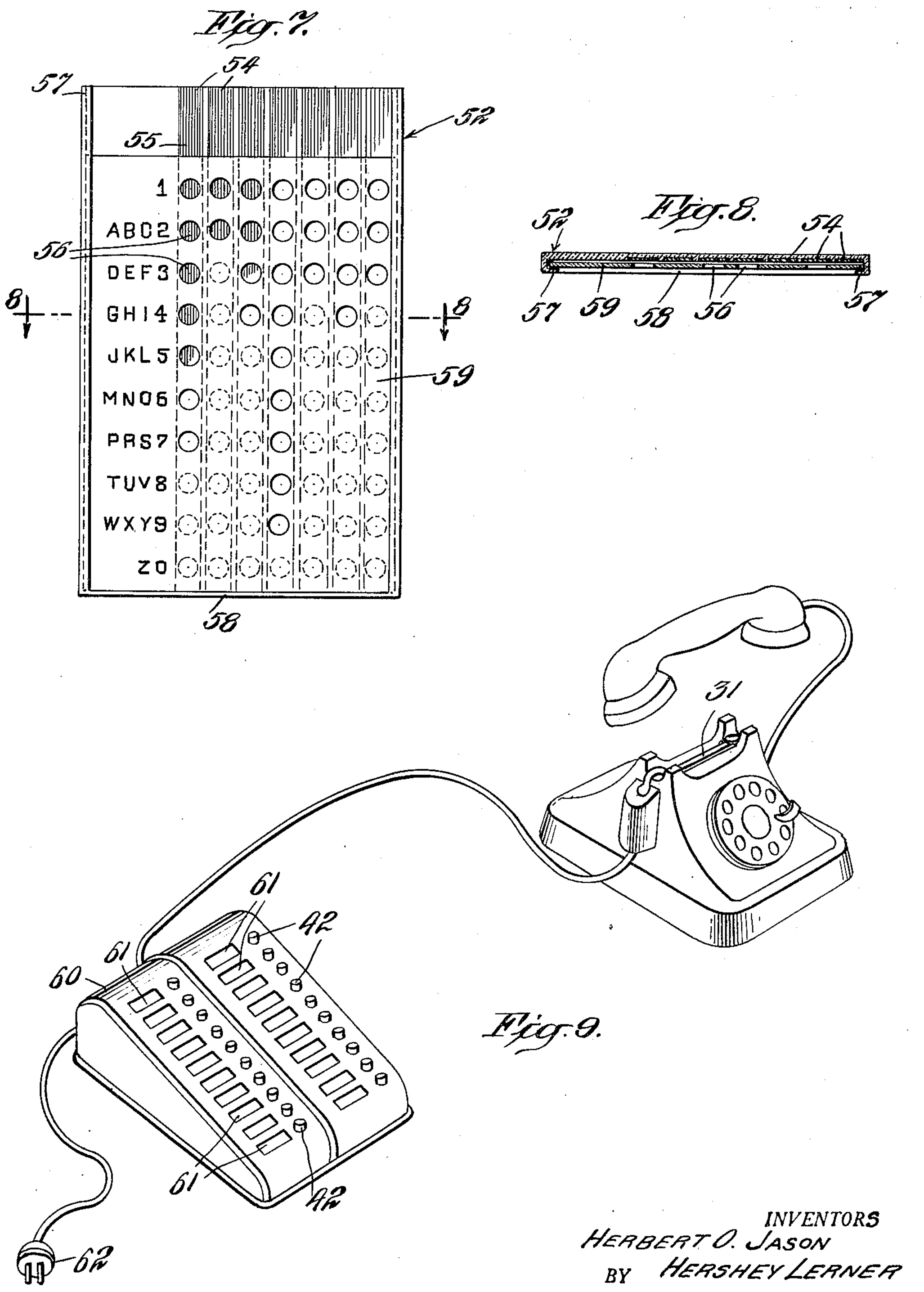
Fig. 7 is a face view of a modified type of code card.
Fig. 8 is a section along the lines 8—8 of Fig. 7.
Fig. 9 is an elevation of a telephone equipped for use with the circuit illustrated in Fig. 2.

The control card 52, illustrated in Figs. 7 and 8, consists of a molded base 53 of a dielectric material such as a thermoplastic resin having seven spaced strips 54 of a conductive material such as copper imbedded in its face. Each strip 54 has an end area 55 and ten indexed areas 56 of equal size. The base 53 has inwardly extending flanges 57 along its edges and a ledge 58 along its bottom to support a shield 59 of dielectric material such as cardboard. The shield 59 is adapted to cover the indexed areas 56 so that those areas are insulated from the contacts 14, and is scored so that the portion which covers any indexed area 56 is easily removed. Any desired number of the ten contacts 14 in each row may be connected with the contact 20 of that row by merely removing the portions of shield 59 which cover the indexed areas 56 corresponding with those contacts. The branches of the circuit connected to contacts which are insulated from the conductive strips by the shield are interrupted so that, on rotation of the wiper of the impulse device, no current impulse is passed through those branches.

The apparatus described is housed in a call box 60 from the face of which the push buttons 42 project and which bears an identifying card 61 opposite each push button. The line wires 24, 25 are connected with a plug 62 through which the device may be connected with the current source. The call box illustrated in Fig. 9 contains twenty coding devices 15, 15'. It will be appreciated, however, that a greater or lesser number of such coding devices may be utilized in the practice of our invention.

What is claimed is:

1. A remote control system for utilizing a coded series of electric current impulses, comprising an electric circuit containing in series a source of electromotive force, an electromagnetic device and a plurality of groups of parallel normally open branches each containing two switches in series, coding means for closing one switch in selected branches of each group simultaneously, and means operable thereafter to close and open the other switch in all the branches in succession so as to permit groups of current impulses having a selected number of impulses in each group to be sent through the circuit.

2. Apparatus for automatically operating a dial telephone to call a predetermined number, comprising an electric circuit containing in series a source of electromotive force, an electromagnetic device and a plurality of groups of parallel normally open branches each containing two switches in series, coding means for closing one switch in selected branches of each group simultaneously, and means operable thereafter to close and open the other switch in all the branches in succession so as to permit groups of current impulses having a selected number of impulses in each group and which actuate the electromagnetic device to be sent through the circuit.

3. Apparatus for automatically operating a dial telephone having a line-switching plunger adapted to be depressed to call a predetermined number, comprising the combination of a current-actuated device for depressing the line-switching plunger of the telephone and an electric circuit containing a plurality of groups of parallel normally open branches each containing two switches in series, coding means for closing one switch in selected branches of each group, and means operable thereafter to close and open the other switch in all the branches in succession so as to send through the circuit groups of current impulses having a selected number of impulses in each group and which actuate said depressing device.

4. Apparatus for automatically operating a dial telephone to call a predetermined number, comprising the combination with the telephone circuit of a magnetic switch in said circuit and an auxiliary circuit containing a current-responsive device for opening said switch, a plurality of groups of parallel normally open branches each containing two switches in series, coding means for closing one switch in selected branches of each group, and means operable thereafter to close and open the other switch in all the branches in succession so as to send through the circuit groups of current impulses having a selected number of impulses in each group and which actuate said current-responsive device.

5. Apparatus for automatically operating a dial telephone to call a predetermined number, comprising a normally open switch and a normally closed switch in series in the circuit of the telephone, means for closing the normally open switch during a predetermined time limit, and means for opening the normally closed switch in accordance with a coded series of current impulses, comprising an auxiliary circuit containing a current-responsive device and a plurality of groups of normally open branches each containing two switches in series, coding means for closing one switch in selected branches of each group, and means operable thereafter to close and open the other switch in all the branches in succession.

6. Apparatus for automatically operating a dial telephone to call a predetermined number, comprising an electric circuit containing in series a source of electromotive force, a current-responsive device and a plurality of groups of parallel branches each containing two switches in series, coding means for closing one switch in selected branches of each group, an impulse device adapted to close and open the other switch in all the branches in succession so as to send through the circuit groups of current impulses having a selected number of impulses in each group, an electric motor for operating the impulse device, and automatic means controlled by the impulse device for stopping the motor after a current impulse has been sent through each of the selected branches.

7. Apparatus for automatically operating a dial telephone to call any one of several predetermined numbers, comprising an electric circuit having a plurality of groups of parallel branches, a plurality of coding devices connected in parallel in all said branches, each of said coding devices being provided with normally inoperative means for closing selected branches of each group, an impulse device adapted to permit a current impulse to flow through all of the branches in succession, means for operating the impulse device, means for putting the circuit-closing means of a selected coding device into operation and starting the impulse device, and means controlled by the impulse device for automatically stopping that device and placing the circuit-closing means of the selected coding device out of operation after the impulse device has sent a current impulse through each selected branch.

8. Automatic apparatus for operating a dial telephone to call a predetermined number, comprising a normally open switch and a normally closed switch in series in the circuit of the telephone, an auxiliary circuit containing a current-responsive device and a coding device adapted to send groups of selected numbers of current impulses through the current-responsive device to open the normally closed switch, and means for closing the normally open switch for a predetermined period during and after operation of said coding device.

HERBERT O. M. JAMPOLER.
HERSHEY LERNER.

REFERENCES CITED

The following references are of record in the file of this patent:

UNITED STATES PATENTS

| Number | Name | Date |
| --- | --- | --- |
| 1,570,030 | Balch | Jan. 19, 1926 |
| 1,882,106 | Wise | Oct. 11, 1932 |
| 2,072,572 | Vanheerswynghels | Mar. 2, 1937 |
| 2,171,556 | Higginbottom | Sept. 5, 1939 |
| 2,195,519 | MacKenzie | Apr. 2, 1940 |
| 2,244,231 | Armbruster | June 3, 1941 |
| 2,348,758 | Sanburg | May 16, 1944 |